US012721709B2

(12) United States Patent
Dai et al.

(10) Patent No.: US 12,721,709 B2
(45) Date of Patent: Sep. 1, 2026

(54) SWITCH ASSEMBLY FOR CLEANING AND CARING APPLIANCE AND CLEANING AND CARING APPLIANCE

(71) Applicant: SHANGHAI SHIFT ELECTRICS CO., LTD., Shanghai (CN)

(72) Inventors: Xiaoguo Dai, Shanghai (CN); Zhenwu Xu, Shanghai (CN)

(73) Assignee: SHANGHAI SHIFT ELECTRICS CO., LTD., Shanghai (CN)

( * ) Notice: Subject to any disclaimer, the term of this patent is extended or adjusted under 35 U.S.C. 154(b) by 318 days.

(21) Appl. No.: 18/708,222

(22) PCT Filed: Sep. 30, 2022

(86) PCT No.: PCT/CN2022/122961
§ 371 (c)(1),
(2) Date: May 8, 2024

(87) PCT Pub. No.: WO2023/082890
PCT Pub. Date: May 19, 2023

(65) Prior Publication Data

US 2025/0009489 A1 Jan. 9, 2025

(30) Foreign Application Priority Data

Nov. 11, 2021 (CN) ........................ 202111331716.6

(51) Int. Cl.
*H01H 23/04* (2006.01)
*A61C 17/22* (2006.01)
*H01H 23/16* (2006.01)

(52) U.S. Cl.
CPC .......... *A61C 17/221* (2013.01); *A61C 17/225* (2013.01); *H01H 23/04* (2013.01); *H01H 23/16* (2013.01)

(58) Field of Classification Search
CPC .... H01H 23/143; H01H 23/30; H01H 23/025; H01H 2300/03; H01H 23/145;
(Continued)

(56) References Cited

U.S. PATENT DOCUMENTS 5,514,843 A * 5/1996 Wilfong ................ H01H 23/02 200/18
5,693,920 A * 12/1997 Maeda .................. B60R 16/005 200/1 B (Continued)

FOREIGN PATENT DOCUMENTS

CN 104771234 A 7/2015
CN 104851619 A 8/2015

(Continued)

OTHER PUBLICATIONS

International Search Report of PCT/CN2022/122961.

*Primary Examiner* — Ahmed M Saeed
(74) *Attorney, Agent, or Firm* — Kilpatrick Townsend & Stockton LLP

(57) ABSTRACT

A switch assembly for a cleaning and caring appliance. The switch assembly comprises: a switch; and a switch rocker having a distal end and a proximal end, the switch being arranged below the distal end of the switch rocker such that the switch rocker operatively triggers the switch, wherein the rocker comprises a small arm, a large arm, and a pivoting portion located between the small arm and the large arm, the large arm having a length greater than that of the small arm, and the large arm comprising the distal end; and the switch assembly further comprises a first retaining portion for retaining the pivoting portion of the switch rocker and a second retaining portion for retaining the proximal end of the switch rocker, and the second retaining portion retains an end of the small arm away from the pivoting portion.

10 Claims, 6 Drawing Sheets

(58) Field of Classification Search
CPC .. H01H 2221/016; H01H 23/14; H01H 23/04; H01H 23/168; H01H 2221/018; H01H 23/02; H01H 23/12; H01H 23/003; H01H 23/146; H01H 23/16; H01H 23/20; H01H 23/28; H01H 23/00; H01H 23/148; H01H 23/24; H01H 23/26; H01H 3/46; H01H 9/06; A61C 17/221; A61C 17/225; A61C 17/22
See application file for complete search history.

(56) References Cited

U.S. PATENT DOCUMENTS

| | | | | |
|---|---|---|---|---|
| 11,211,211 | B2 * | 12/2021 | Bouvier ................. | H01H 3/122 |
| 2005/0039284 | A1 | 2/2005 | Paustell | |
| 2005/0059858 | A1 * | 3/2005 | Frith ...................... | H03K 17/97<br>600/118 |

FOREIGN PATENT DOCUMENTS

| | | | |
|---|---|---|---|
| CN | 213156653 | U | 5/2021 |
| CN | 216818182 | U | 6/2022 |

* cited by examiner

SWITCH ASSEMBLY FOR CLEANING AND CARING APPLIANCE AND CLEANING AND CARING APPLIANCE

FIELD

The present disclosure relates to a cleaning and caring appliance, such as an electric toothbrush, and in particular to a switch assembly in a cleaning and caring appliance.

BACKGROUND ART

At present, various hand-held electric cleaning and caring appliances, such as electric toothbrushes, oral irrigators and shavers, are available on the market. Such electric cleaning and caring appliances are each generally provided with a handle, and a switch portion is provided at an appropriate position on a surface of a housing of the handle. In general, when a user holds the handle of the electric cleaning and caring appliance with one hand, the user can easily press the switch portion with a finger to actuate a switching device arranged inside the handle and below a switching operation portion.

Typically, the switch portion on the handle housing is made of an elastic material, such as TPE, and the actuatable switching device is arranged below the elastic material. In this way, the switching device can be triggered by the user pressing the switch portion to deform the elastic material. Inside the handle, the switching device may be mounted on a circuit board, or the switching device may be arranged separately and connected to a power source by means of a wire. A switch assembly having the elastic material and the switching device ensures that the switch portion of the cleaning and caring appliance can be of a waterproof structure, which is particularly beneficial for electric appliances such as electric toothbrushes and oral irrigators that require waterproofing.

However, such a switch arrangement structure has limitations. The switching device can only be mounted directly below the switch portion made of an elastic material, and the switch portion usually needs to match the mounting position of the switching device inside the handle, resulting in insufficient flexibility of arrangement of the switch portion. Sometimes, in order to meet the convenience of operation, the switching device inside the handle is arranged away from a motor or a battery, and additional wires are required for electrical connection, resulting in complexity of the internal electrical structure of the appliance.

Therefore, it is desired to improve the switch assembly of the electric cleaning and caring appliance to avoid using additional wires for connection of the switching device to improve the flexibility of layout in position of the switching device inside the handle of the electric cleaning and caring appliance.

SUMMARY OF THE DISCLOSURE

In order to overcome the shortcomings in the prior art, the present disclosure provides a switch assembly for a cleaning and caring appliance, the switch assembly including: a switch configured to perform a switching operation for the cleaning and caring appliance; and a switch rocker having a distal end and a proximal end, the switch being arranged below the distal end of the switch rocker and the switch rocker operatively triggers the switch, and the rocker includes a small arm, a large arm, and a pivoting portion located between the small arm and the large arm, the large arm having a length greater than that of the small arm, and the large arm including the distal end; and the switch assembly further includes a first retaining portion for retaining the pivoting portion of the switch rocker and a second retaining portion for retaining the proximal end of the switch rocker, and the second retaining portion retains an end of the small arm away from the pivoting portion, and when no pressing force acts on the switch rocker, the small arm of the switch rocker is bent and deformed to be in a pre-tensioned state, while the switch rocker generates a first moment around the pivoting portion to make the large arm tend to move away from the switch.

According to one embodiment of the present disclosure, the switch is provided with an elastic member which generates an elastic force acting on the large arm of the switch rocker, and a second moment generated by the elastic force around the pivoting portion is in the same direction as the first moment.

According to a further embodiment of the present disclosure, the large arm of the switch rocker defines a pressing portion between the pivoting portion and the switch, and an external force for actuating the switch assembly is capable of acting on the pressing portion.

According to a further embodiment of the present disclosure, the switch assembly includes a switch portion located on a housing of the cleaning and caring appliance, the switch portion being made of a deformable elastic material, and the switch portion being aligned with the pressing portion.

According to a further embodiment of the present disclosure, the first retaining portion is arranged on a component that is stationary relative to the housing of the cleaning and caring appliance, and the first retaining portion includes pairs of U-slots located inside the cleaning and caring appliance, and the pivoting portion includes pairs of shaft portions which are respectively accommodated in the corresponding U-slots.

According to a further embodiment of the present disclosure, the second retaining portion is arranged on a component that is stationary relative to the housing of the cleaning and caring appliance, and the second retaining portion includes an opening for fixing inside the cleaning and caring appliance, a free end of the small arm being inserted and retained in the opening. The opening may be a blind hole or a through hole.

According to a further embodiment of the present disclosure, the switch is mounted on a circuit board inside the cleaning appliance.

In addition, the present disclosure further provides an electric cleaning and caring appliance, including: a housing forming an elongated accommodating cavity in which a battery and a drive device are arranged in a longitudinal direction; and a switch assembly as described above accommodated in the housing; and the switch rocker of the switch assembly is arranged substantially parallel to the longitudinal direction.

In the cleaning and caring appliance according to the present disclosure, the switch of the switch assembly is mounted on a circuit board, the circuit board is arranged between the battery and a motor of the drive device, the circuit board is fixed to a frame, and the circuit board is connected to at least one electrode of the motor and at least one electrode of a power source.

In addition, in the cleaning and caring appliance according to the present disclosure, a gear box that accommodates at least a part of the drive device and a gear box cover that is attached to the gear box are provided inside the housing, the first retaining portion is arranged on the gear box, and the second retaining portion is arranged on the gear box cover.

According to the solution of the present disclosure, it is possible to ensure the compactness of layout of the components inside the housing while allowing the position of arrangement of the switch portion on the handle housing to meet the ergonomic design requirements. The switch portion is approximately located at a proximal end of the drive device or at a position where the drive device is connected to a transmission device, and the switch may be directly fixed to the circuit board arranged away from this position without the need for a long wire to connect the switch or the circuit board, on which the switch is mounted, to the battery, and the internal layout of an electric toothbrush is more compact, and the mounting process of the components inside the electric toothbrush is also simplified.

BRIEF DESCRIPTION OF THE DRAWINGS

For a more complete understanding of the present disclosure, the following description of exemplary embodiments can be considered with reference to the drawings, in which.

LIST OF REFERENCE SIGNS

Figure 1:
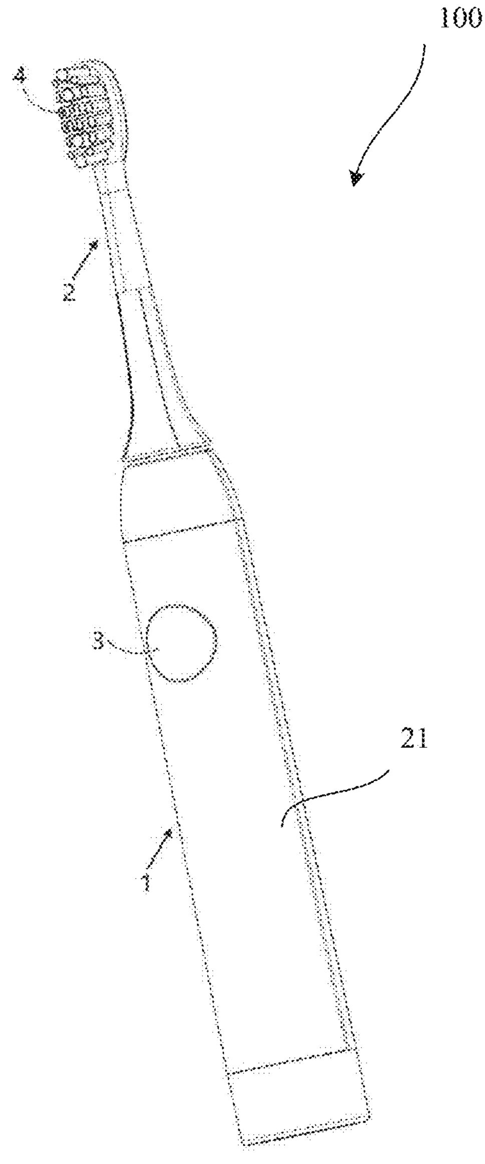
FIG. 1 shows a perspective view of an electric toothbrush according to one embodiment of the present disclosure.

1 Handle
2 Brush head
3 Switch portion
4 Cleaning element
5 Battery
6 Frame
7 Box body
8 Box cover
9 Motor
10 Switch rocker
11 Small arm
12 Proximal end
13 Pivoting portion
14 Large arm
15 Distal end
20 Drive shaft
21 Handle housing
30 Circuit board
31 Switch
71 U-slot
81 Opening
100 Electric toothbrush.

DETAILED DESCRIPTION OF EMBODIMENTS

The present disclosure will be further described below with reference to some embodiments and drawings, and more details are set forth in the following description to facilitate a full understanding of the present disclosure. However, the present disclosure can be implemented in many other ways than as described herein, and similar promotions and deductions based on practical applications. Therefore, the scope of protection of the present disclosure should not be limited to the content of the embodiments.

Exemplary embodiments of the present disclosure will be described in more detail below with reference to the drawings, taking an electric toothbrush as a typical example of a personal cleaning and caring appliance. Although the following explanation is provided by only taking an electric toothbrush as an example, the present disclosure is not limited thereto. The present disclosure is also applicable to electric shavers, electric facial cleaners, electric showers and other cleaning and caring appliances that can provide cleaning actions by means of a drive device.

For the sake of clarity, the words such as "proximal end/side" and "distal end/side" expressing relative positions in space are used in this specification to simply describe the relationship between an element or a feature and further element(s) or feature(s) as shown in the figures. "Proximal end/side" refers to an end or a side close to the position where a cleaning action force acts when the cleaning and caring appliance is in use; and "distal end/side" refers to an end or a side away from the position where the cleaning action force acts when the cleaning and caring appliance is in use.

In addition, the word "and/or" used in the present application includes any and all combinations of one or more of the listed associated words.

Although the words such as "first" are used in this specification to describe multiple elements or components, these elements or components should not be limited by these words. These words are only used to distinguish one element or component from another element or component and do not include a "sequence". Therefore, the ordinal numbers of the elements or components discussed below can be interchanged without departing from the concept and scope of the present disclosure.

FIG. 1 shows a perspective view of an appearance of a cleaning and caring appliance according to one embodiment of the present disclosure. The cleaning and caring appliance shown in FIG. 1 is an electric toothbrush, mainly including a handle 1 adapted to be held with one hand and a brush head 2 detachably mounted on the handle 1, the handle 1 and the brush head 2 being arranged adjacent to each other in a longitudinal direction of the entire electric toothbrush. The brush head 2 is provided with cleaning elements 4, such as bristles. The handle 1 includes a handle housing 21 and functional components mounted in the handle housing 21.

As shown in FIG. 1, the electric toothbrush includes the generally elongated cylindrical handle housing 21, and a switch portion 3 is provided in the middle of the handle housing 21. The switch portion 3 includes a membrane made of an elastic material, which may be generally circular or oval, corresponding to the shape of a human finger. For the elongated cylindrical handle housing 21 of the electric toothbrush, the switch portion 3 may be arranged in the middle and close to a proximal end, which allows for a user to hold the handle with one hand to actuate the switch portion. In one embodiment, the switch portion 3 made of an elastic material and the handle housing 21 may be formed integrally or separately.

Figure 2:
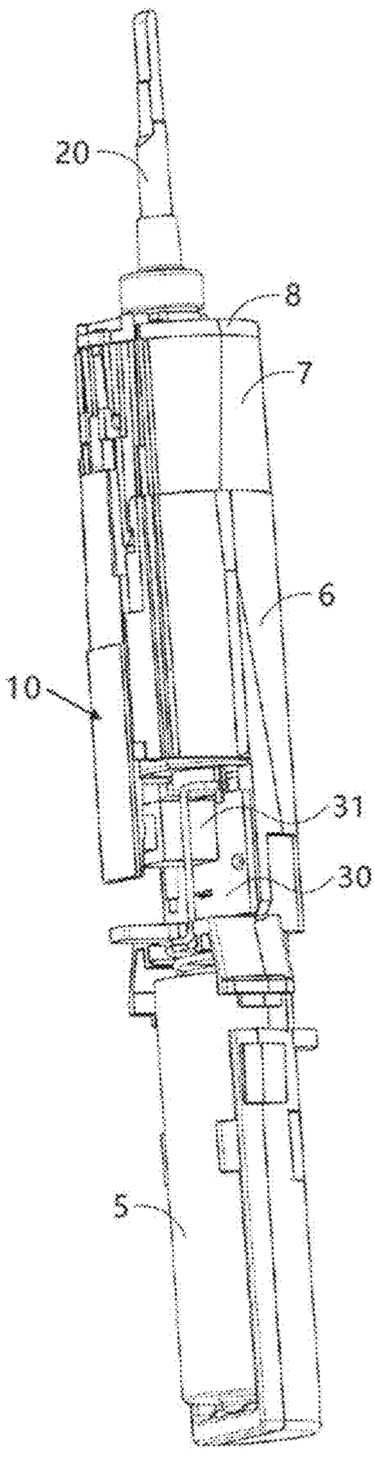
FIG. 2 shows a perspective view of an internal structure of the electric toothbrush shown in FIG. 1 according to one embodiment of the present disclosure.

FIG. 2 further shows an internal structure of the electric toothbrush according to one embodiment of the present disclosure. As shown in FIG. 2, the electric toothbrush includes a battery 5 as a power source, a drive device for providing a driving force for the brush head 2, a transmission device for transferring the driving force to the brush head 2, a drive shaft 20 attached to the brush head 2, a switch assembly, and a circuit board 30, which components or parts are substantially accommodated in a chamber formed by the handle housing 21.

The battery 5 is arranged in the chamber of the handle and close to a distal end that is away from the brush head. The drive device mainly includes a motor 9 and a frame 6. The motor 9 is fixed to the frame 6, and an output shaft of the motor 9 extends from a proximal end of the motor 9 close to the drive device. In a longitudinal direction of the handle 1, the circuit board 30 is arranged between the motor 9 and the battery 5, and the circuit board 30 is also generally fixed to the frame 6. The circuit board 30 is electrically connected to at least one electrode of the motor 9 on one hand, and is electrically connected to at least one of a positive electrode and a negative electrode of the power source on the other hand.

Further, the transmission device is mounted at a proximal side of the drive device, and the transmission device mainly includes a connecting rod mechanism and a gear box that accommodates the connecting rod mechanism. The connecting rod mechanism is connected to the output shaft of the motor 9 and the drive shaft 20, to convert the rotational motion of the output shaft of the motor 9 around its longitudinal axis into reciprocating rotation of the drive shaft 20.

The drive shaft 20 is located on a proximal side of the electric toothbrush 100, and extends from an opening at a proximal end of the handle housing 21. The drive shaft 20 has a longitudinal axis, the longitudinal axis of the drive shaft 20 is substantially parallel to the longitudinal axis of the output shaft of the motor 9, and the two longitudinal axes are aligned with each other. The brush head 2 is snap-fitted to the drive shaft 20 by means of a snap-fit structure, and the brush head 2 can rotate in a reciprocating manner around the longitudinal axis of the drive shaft 20 together with the drive shaft 20.

In particular, the switch assembly in the electric toothbrush 100 mainly includes a switch 31 and a switch rocker 10, the switch 31 being directly mounted on the circuit board 30, and the switch rocker 10 being arranged inside the chamber of the handle 1 and in a space between the drive device and the handle housing and between the transmission device and the handle housing. The length direction of the switch rocker 10 is substantially parallel to the longitudinal direction of the handle.

Figure 3:
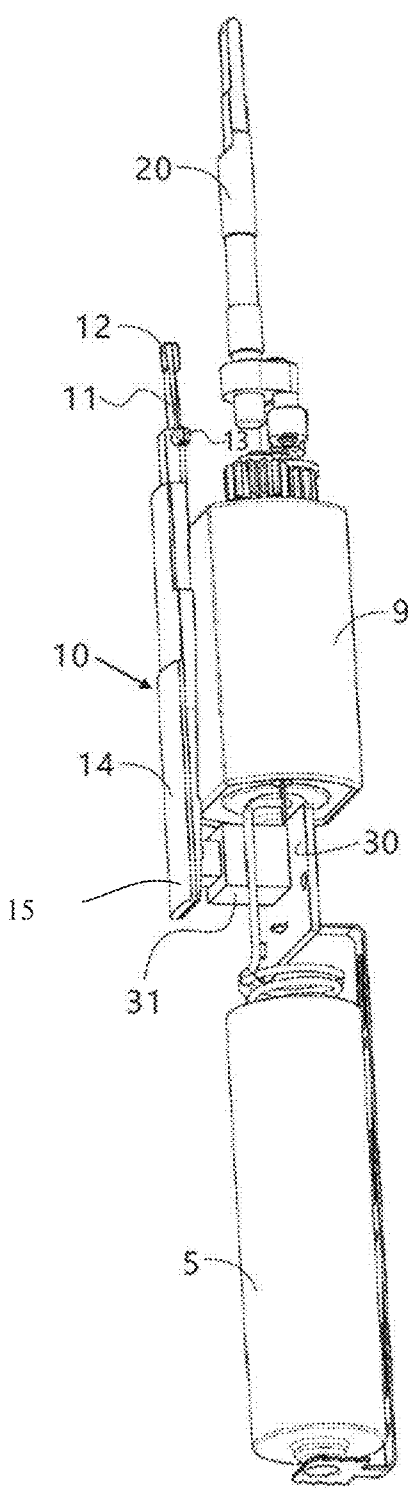
FIG. 3 shows another perspective view of the internal structure of the electric toothbrush shown in FIG. 1 according to one embodiment of the present disclosure, in which a gear box is removed to show a transmission mechanism inside.
Figure 4:
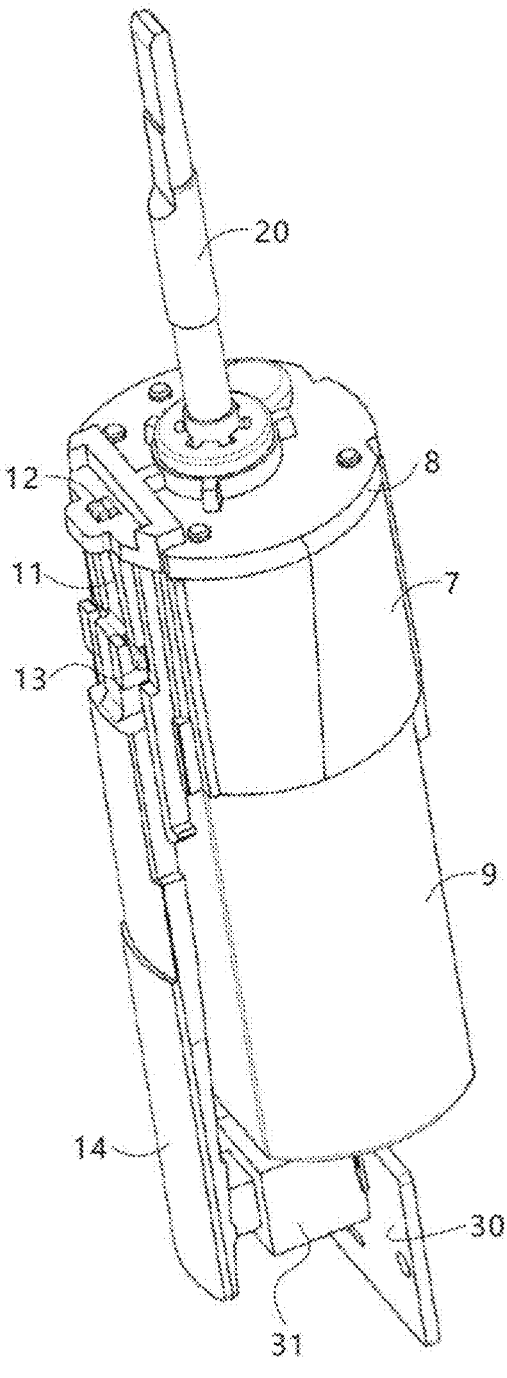
FIG. 4 shows another perspective view of the internal structure of the electric toothbrush shown in FIG. 1 according to one embodiment of the present disclosure, in which a battery is removed.

FIG. 3 clearly shows the configuration of the switch assembly according to one embodiment of the present disclosure. The switch rocker 10 includes a small arm 11, a large arm 14, and a pivoting portion 13 located between the small arm 11 and the large arm 14. In one embodiment, the rocker 10 is integrally formed of a resin material, and the small arm 11, the large arm 14 and the pivoting portion 13 form an integral part. In general, the length of the large arm 14 in the longitudinal direction is greater than the length of the small arm 11 in the longitudinal direction. The switch 31 on the circuit board 30 is arranged below a free end or a distal end 15 of the large arm 14, and the switch 31 may fit with the free end of the large arm 14 in a linkage manner. By means of actuating the switch rocker 10, the switch 31 may be actuated accordingly, to achieve electrical switching of the switch 31. As shown in FIGS. 3 and 4, the switch rocker 10 is strip-shaped, but has different widths in the longitudinal direction, the small arm 11 being narrower at a proximal end 12, and the large arm 14 being wider at the distal end 15.

Figure 6:
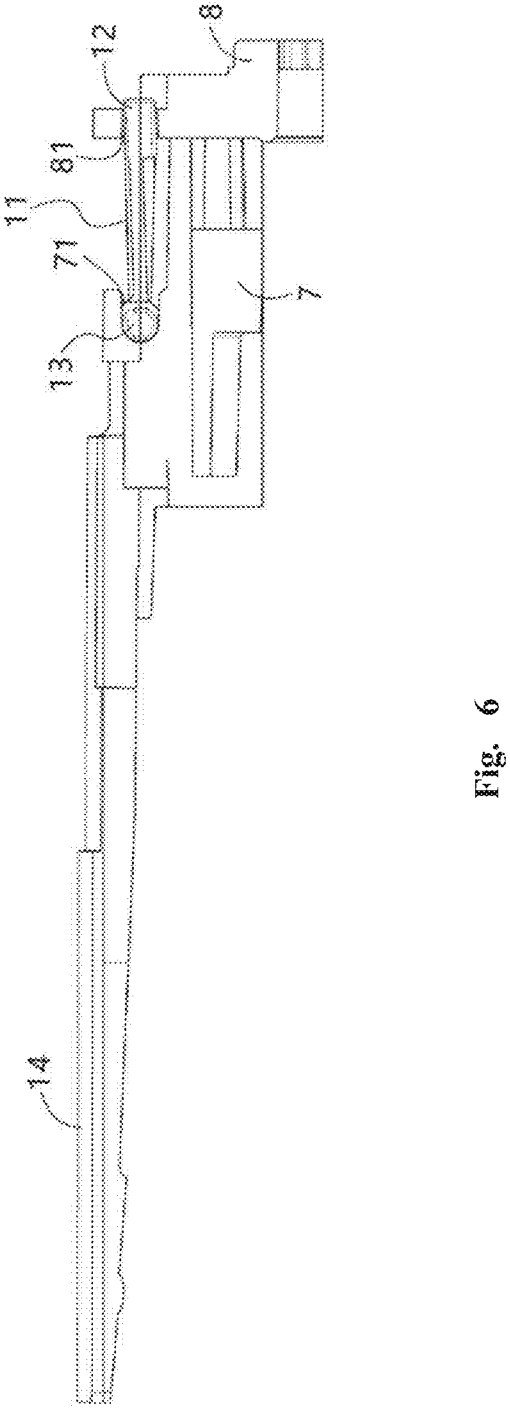
FIG. 6 shows a side view of the switch assembly and the gear box according to one embodiment of the present disclosure in a mounting fit state.

Further, as shown in FIGS. 4 and 6, the pivoting portion 13 of the switch rocker 10 and the proximal end 12 of the small arm 11 are retained with limited movement. In one embodiment, the pivoting portion 13 of the switch rocker 10 is retained by a first retaining portion, and the proximal end of the small arm 11 is retained by a second retaining portion, the first retaining portion and the second retaining portion being both components that are stationary relative to the handle housing 21. In one embodiment, the first retaining portion and the second retaining portion are both arranged on the gear box of the transmission device.

As shown in FIG. 6, in one embodiment, the first retaining portion for retaining the pivoting portion 13 includes pairs of U-slots 71 on a box body 7 of the gear box, and the pivoting portion 13 includes pairs of shaft portions, each shaft portion being accommodated in a corresponding U-slot 71. The U-slot 71 substantially limits the movement of the shaft portion in a longitudinal direction perpendicular to the handle, but allows the shaft portion to rotate within the U-slot 71.

In one embodiment, as also shown in FIG. 6, the second retaining portion for retaining the proximal end 12 of the switch rocker 10 includes an opening 81 in a box cover 8 of the gear box, and the narrow proximal end 12 of the small arm 11 is inserted into the opening 81 and held fixed by means of the opening 81. At this time, the opening 81 in the gear box cover limits the movement of the proximal end of the small arm 11 in any direction. In one embodiment, the opening 81 may be a blind hole or a through hole.

It should be understood that the first retaining portion and the second retaining portion may be respectively integral parts of the box body 7 and the box cover 8 of the gear box, or may be accessories attached to the box body 7 and the box cover 8. In one embodiment, the pairs of shaft portions serving as the pivoting portion 13 are arranged on two sides of the rocker 10. In other embodiments, the pivoting portion 13 may also be arranged on a side of the rocker 10 opposite to the gear box.

Figure 5:
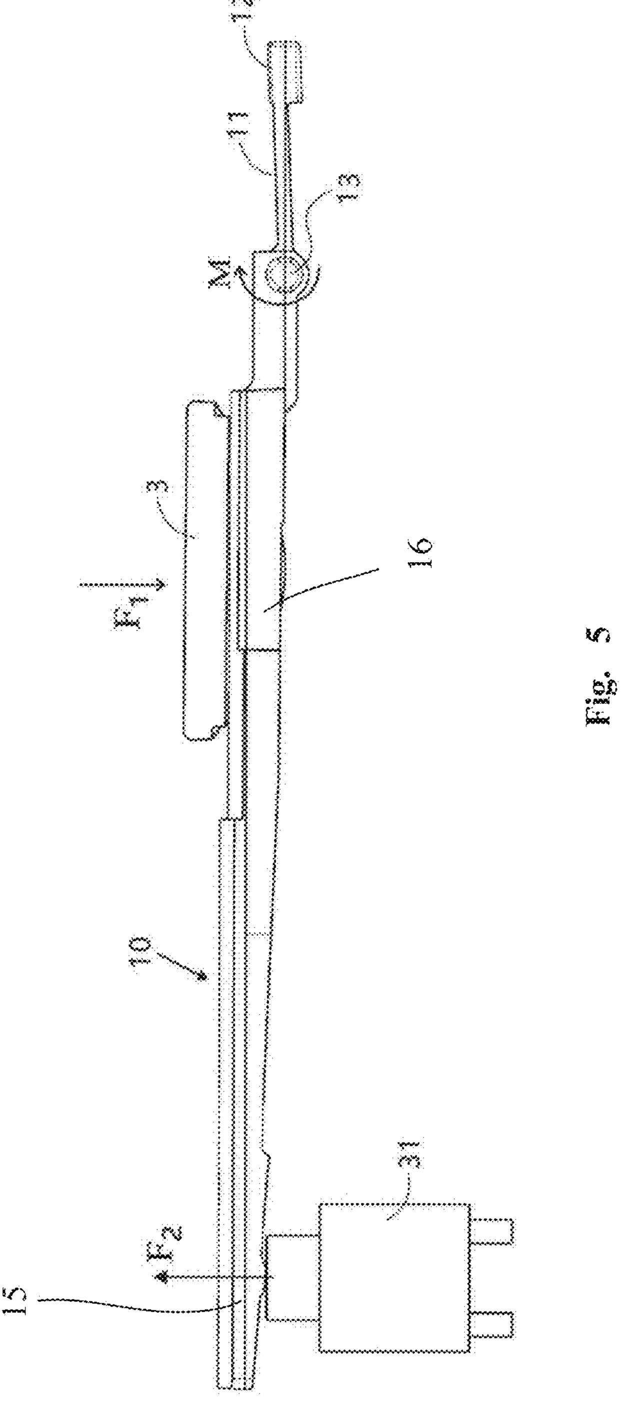
FIG. 5 shows a schematic diagram of force analysis of a switch rocker of a switch assembly according to one embodiment of the present disclosure.

In particular, the proximal end 12 of the small arm 11 is retained by the opening 81, and when the switch 31 is in an off state, the small arm 11 of the switch rocker 10 is bent and deformed to be in a pre-tensioned state, and at this time, the switch rocker 10 generates a first moment M around the pivoting portion 13 to make the large arm 14 tend to move away from the switch 31, as shown in FIG. 5.

The relative positions of the first retaining portion and the second retaining portion are arranged and the switch rocker 10 can reach such a pre-tensioned state. In one embodiment, the opening 81 in the gear box cover is offset to an inner side in a transverse direction, i.e., the side close to the center of the chamber of the handle, relative to the position of the proximal end 12 of the small arm 11 of the switch rocker 10 in a freely extended state when the shaft portion is received in the U-slot 71. When the proximal end 12 of the small arm 11 is forced to stay in the opening 81, the small arm 11 will be bent and deformed to reach the pre-tensioned state. With a pre-tensioning force on the small arm 11, the pivoting portion 13 of the switch rocker 10 correspondingly generates the first moment M in a direction as shown in FIG. 5, to make the large arm 14 tend to move away from the switch 31.

On the other hand, the switch 31 is generally provided with an elastic member (not shown) which generates an elastic force F2 on a movable component of the switch 31, as shown in FIG. 5, the elastic force F2 acts on the distal end 15 of the switch rocker 10, and a second moment generated by the elastic force F2 of the elastic member around the pivoting portion 13 is in the same direction as the first moment generated by the pre-tensioning force.

The second moment generated by the switch 31 itself and the first moment generated in the pre-tensioned state of the small arm 11 ensure that the switch 31 below the free end of the large arm 14 is not actuated when the switch portion 3 of the handle housing 21 is not actuated.

As shown in FIG. 5, the large arm 14 defines a pressing portion 16 between the pivoting portion 13 and the switch portion 3, and an external force for actuating the switch assembly can act on the pressing portion 16 of the large arm 14 by means of the switch portion 3. In one embodiment, the pressing portion 16 is closer to the pivoting portion 13 than the free end of the large arm 14. The switch portion 3 on the housing 21 is substantially aligned with the pressing portion 16. Since the switch portion 3 is made of an elastic material, the pressing force acting on the switch portion 3 can be transmitted to the pressing portion 16 of the large arm 14.

When the user actuates the switch 31, the pressing force is applied to the pressing portion 16 of the large arm 14, the direction of the pressing force is opposite to that of the elastic force of the switch 31, and the pressing force generates a third moment around the pivoting portion 13 that is opposite to the first moment and the second moment. When the pressing force is large enough and the third moment is greater than the sum of the first moment and the second moment, the free end of the large arm 14 may rotate around the pivoting portion toward the switch 31 to actuate the switch 31, to complete the desired switching operation.

As shown in FIG. 2, after the proximal end 12 and the pivoting portion 13 of the switch rocker 10 are fixed to the gear box, the switch rocker 10 extends from the proximal end of the gear box to the circuit board 30 between the drive device and the battery 5, and at this time, the pressing portion 16 is close to the proximal end of the drive device. The switch portion 3 is located on a part of the handle housing 21 close to the proximal end, and when a user holds the handle with one hand, the user's finger can just press the switch portion 3, and in the chamber of the housing 21, the switch 13 is arranged approximately in the middle of the entire handle in the longitudinal direction, and the switch 31 can be arranged away from the switch portion 3 on the housing 21, which ensures the compactness of layout of the components inside the housing 21 while allowing the arrangement position of the switch portion 3 on the handle housing 21 to meet the ergonomic design requirements. The switch portion 3 is approximately located at the proximal end of the drive device or at a position where the drive device is connected to the transmission device, and according to the solution of the present disclosure, the switch can be arranged away from this position without the need for a long wire to connect the switch or the circuit board 30, on which the switch is mounted, to the battery 5, and the mounting process of the components inside the electric toothbrush is simplified.

Although the present disclosure is disclosed as above in terms of the preferred embodiments, they are not intended to limit the present disclosure, and possible changes and alterations disclosure can be made. Hence, any alterations, equivalent changes and modifications, which are made to the above embodiments based on the essence of the present disclosure without departing from the content of the solutions of the present disclosure, shall fall within the scope of protection defined by the claims of the present disclosure.

The invention claimed is:

1. A switch assembly for a cleaning and caring appliance, the switch assembly comprising:
- a switch configured to perform a switching operation for the cleaning and caring appliance; and
- a switch rocker having a distal end and a proximal end, the switch being arranged below the distal end of the switch rocker and the switch rocker operatively triggers the switch,
- wherein
- the switch rocker comprises a small arm, a large arm, and a pivoting portion located between the small arm and the large arm, the large arm having a length greater than that of the small arm, and the large arm comprising the distal end;
- the switch assembly further comprises a first retaining portion for retaining the pivoting portion of the switch rocker and a second retaining portion for retaining the proximal end of the switch rocker;
- the second retaining portion retains an end of the small arm away from the pivoting portion, and when no pressing force acts on the switch rocker, the small arm of the switch rocker is bent and deformed to be in a pre-tensioned state, while the switch rocker generates a first moment (M) around the pivoting portion to make the large arm tend to move away from the switch.

2. The switch assembly according to claim 1, wherein the switch is provided with an elastic member which generates an elastic force acting on the large arm of the switch rocker, and a second moment generated by the elastic force around the pivoting portion is in the same direction as the first moment.

3. The switch assembly according to claim 1, wherein the large arm defines a pressing portion between the pivoting portion and the switch with a pressing force for actuating the switch assembly being capable of acting on the pressing portion.

4. The switch assembly according to claim 3, wherein the switch assembly comprises a switch portion located on a housing of the cleaning and caring appliance, the switch portion being made of a deformable elastic material, and the switch portion being aligned with the pressing portion.

5. The switch assembly according to claim 1, wherein the first retaining portion is arranged on a component that is stationary relative to a housing of the cleaning and caring appliance, and
- wherein the first retaining portion comprises pairs of U-slots located inside the cleaning and caring appliance, and the pivoting portion comprises pairs of shaft portions which are respectively accommodated in the corresponding U-slots.

6. The switch assembly according to claim 1, wherein the second retaining portion is arranged on a component that is stationary relative to a housing of the cleaning and caring appliance; and
- the second retaining portion comprises an opening for fixing inside the cleaning and caring appliance, the proximal end of the small arm being inserted and retained in the opening, and the opening being a blind hole or a through hole.

7. The switch assembly according to claim 1, wherein the switch is mounted on a circuit board inside the cleaning appliance.

8. A cleaning and caring appliance, comprising:
- a housing forming an elongated accommodating cavity in which a battery and a drive device are arranged in a longitudinal direction; and
- a switch assembly according to claim 1 accommodated in the housing;
- wherein the switch rocker of the switch assembly is arranged substantially parallel to the longitudinal direction.

9. The cleaning and caring appliance according to claim 8, wherein the switch of the switch assembly is mounted on a circuit board, the circuit board is arranged between the battery and a motor of the drive device, the circuit board is fixed to a frame, and the circuit board is connected to at least one electrode of the motor and at least one electrode of the battery.

10. The cleaning and caring appliance according to claim 8, wherein a gear box body that accommodates at least a part of the drive device and a gear box cover that is attached to the gear box body are provided inside the housing, the first retaining portion is arranged on the gear box body, and the second retaining portion is arranged on the gear box cover.

* * * * *